United States Patent
Oshima

(10) Patent No.: US 9,020,078 B2
(45) Date of Patent: Apr. 28, 2015

(54) SIGNAL DETECTION DEVICE, METHOD OF CONTROLLING SAME, PROGRAM, AND WIRELESS COMMUNICATION DEVICE

(75) Inventor: Naoki Oshima, Tokyo (JP)

(73) Assignee: NEC Corporation, Tokyo (JP)

( * ) Notice: Subject to any disclaimer, the term of this patent is extended or adjusted under 35 U.S.C. 154(b) by 90 days.

(21) Appl. No.: 13/812,547

(22) PCT Filed: Jul. 26, 2011

(86) PCT No.: PCT/JP2011/066930
§ 371 (c)(1),
(2), (4) Date: Jan. 28, 2013

(87) PCT Pub. No.: WO2012/014876
PCT Pub. Date: Feb. 2, 2012

(65) Prior Publication Data
US 2013/0121446 A1    May 16, 2013

(30) Foreign Application Priority Data

Jul. 27, 2010 (JP) ................................ 2010-167802
Jan. 19, 2011 (JP) ................................ 2011-008400

(51) Int. Cl.
H04L 27/06 (2006.01)
H04B 1/10 (2006.01)
H04B 1/30 (2006.01)
H04B 1/00 (2006.01)

(52) U.S. Cl.
CPC .. *H04B 1/10* (2013.01); *H04B 1/30* (2013.01); *H04B 1/0007* (2013.01)

(58) Field of Classification Search
USPC ........................................................ 375/340
See application file for complete search history.

(56) References Cited

U.S. PATENT DOCUMENTS

| | | | | |
|---|---|---|---|---|
| 5,714,702 A | * | 2/1998 | Ishii ................................ 84/462 |
| 5,930,735 A | * | 7/1999 | Pun ................................ 702/119 |
| 5,959,875 A | * | 9/1999 | Kawahara et al. ............. 708/821 |
| 2005/0251008 A1 | * | 11/2005 | Pan ................................ 600/407 |
| 2006/0045212 A1 | * | 3/2006 | Ishii et al. ...................... 375/340 |
| 2011/0019783 A1 | * | 1/2011 | Nakano et al. ................. 375/344 |

(Continued)

FOREIGN PATENT DOCUMENTS

| JP | 3727406 B2 | 12/2005 |
| JP | 2006060721 A | 3/2006 |

(Continued)

OTHER PUBLICATIONS

The international search report for PCT/JP2011/066930 mailed on Oct. 18, 2011.

*Primary Examiner* — Shuwang Liu
*Assistant Examiner* — Nader Bolourchi
(74) *Attorney, Agent, or Firm* — Sughrue Mion, PLLC

(57) ABSTRACT

A signal detection device includes: a band limiting filter in which cutoff frequency is changeable; a signal detection unit that detects whether or not a signal of a specific frequency is present, from a received signal; and a control unit that executes a first signal detection that causes the signal detection unit to detect a signal, with a cutoff frequency of the band limiting filter less than the Nyquist frequency of an A/D converter, and a second signal detection that causes the signal detection unit to detect a signal, with a cutoff frequency of the band limiting filter greater than or equal to the Nyquist frequency of the A/D converter.

20 Claims, 13 Drawing Sheets

(56) References Cited

U.S. PATENT DOCUMENTS

2011/0026509 A1* 2/2011 Tanaka .......................... 370/338
2011/0057688 A1* 3/2011 Mamaril et al. .............. 327/113

FOREIGN PATENT DOCUMENTS

| | | |
|---|---|---|
| WO | 2009128222 A1 | 10/2009 |
| WO | 2009131076 A1 | 10/2009 |

* cited by examiner

SIGNAL DETECTION DEVICE, METHOD OF CONTROLLING SAME, PROGRAM, AND WIRELESS COMMUNICATION DEVICE

CROSS-REFERENCE TO RELATED APPLICATIONS

This application is a National Stage Entry of PCT/JP2011/066930 filed Jul. 26, 2011, which claims priority from Japanese Patent Application 2010-167802 filed Jul. 27, 2010 and further from 2011-008400 filed Jan. 19, 2011, the contents of all of which are incorporated herein by reference, in their entirety.

TECHNICAL FIELD

The present application claims priority from Japanese Patent Application No. JP2010-167802 (filed on Jul. 27, 2010) and Japanese Patent Application No. JP2011-008400 (filed on Jan. 19, 2011), whose contents are hereby incorporated in their entirety by reference into this description. The present invention relates to a signal detection device, a method of controlling the same, a program, and a wireless communication device. In particular the invention relates to a signal detection device that changes a cutoff frequency of a band limiting filter and realizes wideband spectrum sensing.

BACKGROUND

In recent years there has been progress in the development of cognitive radio as represented by IEEE 802.22. Cognitive radio performs communication in which radio wave condition in the area of a base station or a mobile station is confirmed, and in accordance with the conditions thereof, parameters such as frequency used in wireless communication and the like are switched. With regard to a frequency band used in the cognitive radio, a frequency band the same as a frequency band used in digital television is assumed. Furthermore, since frequency bands used in digital television differ according to region, technology known as spectrum sensing is essential in order to find a frequency (empty channel) that is not being used in the area.

Spectrum sensing can be classified by two methods: a method using a characteristic of a received signal and a method not using the same. The method that uses the characteristic of a received signal is called fine sensing, and since the characteristic of the received signal is used, the sensitivity is high and the method is suitable for distinguishing micro signals. On the other hand, the method has a characteristic in that speed of detection is slow and it is not possible to detect an unknown signal.

Meanwhile, the method that does not use a characteristic of a received signal is called blind sensing, and since a characteristic of the received signal is not used, detection of signals is fast and it is possible to detect an unknown signal. However, this method has a characteristic of having low detection sensitivity.

Patent Literature 1 discloses that for signal detection, FFT (Fast Fourier Transform) computation is used normally in a digital area, but a Fourier Transform circuit can be implemented also in an analog area.
Patent Literature 1: Japanese Patent No. 3727406

SUMMARY

The disclosure of Patent Literature 1 given above is hereby incorporated in its entirety by reference thereto. The following analysis is given from a viewpoint of the present invention.

As described above, spectrum sensing is necessary in implementing cognitive radio. In particular, since signal detection sensitivity required in IEEE 802.22 is very high, it is desirable that ultimate determination as to whether or not a television signal is present should use fine sensing. However, since a digital television frequency band extends to a large bandwidth of 50 channels or more, if fine sensing is used for each channel, much time is expended in signal detection.

Therefore, a method is considered in which blind sensing is initially used to perform high speed sensing over a large bandwidth, and after selecting a band less than or equal to a fixed sensitivity, fine sensing is used. This is a method of performing two-stage sensing in which sensing time is shortened, while satisfying required detection sensitivity.

However, even if this two-stage sensing is adopted, when blind sensing is performed it is necessary to change the frequency band of a detection target, leading to a change in local frequency (referred to below as Lo frequency) of a mixer. To switch this Lo frequency, lock time is required for a PLL (Phase Locked Loop) circuit that generates a locally generated signal, and a long time is necessary for this lock. Therefore, the larger the number of times the Lo frequency of the mixer is switched when signal detection is performed, the more the signal detection time increases.

As described above, there are problems to be solved in the conventional technology.

In an aspect of the present invention it is desired to have a signal detection device that curbs detection time generated by switching a signal detection band, a method of controlling the same, a program, and a wireless communication device.

According to a first aspect, there is provided a signal detection device that includes: a band limiting filter in which cutoff frequency is changeable; a signal detection unit that detects whether or not a signal of a specific frequency is present, from a received signal; and a control unit that executes a first signal detection that causes the signal detection unit to detect a signal, with a cutoff frequency of the band limiting filter less than a Nyquist frequency of an A/D (Analog/Digital) converter, and a second signal detection that causes the signal detection unit to detect a signal, with a cutoff frequency of the band limiting filter greater than or equal to the Nyquist frequency of the A/D converter.

According to a second aspect, there is provided a method of controlling a signal detection device including: a band limiting filter in which cutoff frequency is changeable; and a signal detection unit that detects whether or not a signal of a specific frequency is present, from a received signal, wherein the method includes: executing a first signal detection that causes the signal detection unit to detect a signal, with a cutoff frequency of the band limiting filter less than a Nyquist frequency of an A/D (Analog/Digital) converter; and executing a second signal detection that causes the signal detection unit to detect a signal, with a cutoff frequency of the band limiting filter greater than or equal to the Nyquist frequency of the A/D (Analog/Digital) converter. The method is associated with a specific apparatus, known as a signal detection device that is provided with a band limiting filter in which cutoff frequency is changeable, and a signal detection unit that detects whether or not a signal of a specific frequency is present, from a received signal.

According to a third aspect, there is provided a program to be executed on a computer configuring a signal detection device including: a band limiting filter in which cutoff frequency is changeable; and a signal detection unit that detects whether or not a signal of a specific frequency is present, from a received signal; wherein the program executes: a first signal detection process of causing the signal detection unit to detect a signal, with a cutoff frequency of the band limiting filter less than a Nyquist frequency of an A/D (Analog/Digital) converter; and a second signal detection process of causing the signal detection unit to detect a signal, with a cutoff frequency of the band limiting filter greater than or equal to the Nyquist frequency of the A/D converter. It is to be noted that the program may be recorded in a computer readable storage medium. That is, the present invention may be embodied as a computer program product.

According to a fourth aspect, there is provided a wireless communication device having the signal detection device according to the first aspect.

According to the respective aspects of the present invention, there is provided a signal detection device that curbs detection time produced by switching signal detection band.

PREFERRED MODES

Figure 1:
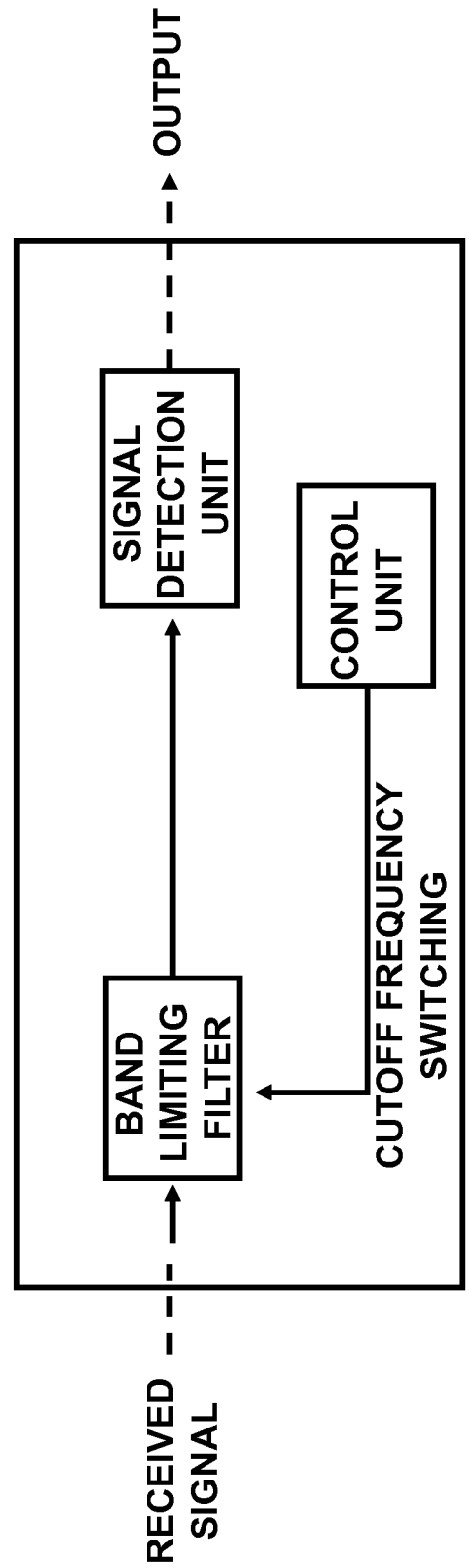
FIG. 1 is a diagram for describing an outline of the present invention.

First, a description is given concerning an outline of an exemplary embodiment of the present invention using FIG. 1. In the following, reference symbols in drawings attached to this summary are examples solely for aiding understanding, and are not intended to limit the invention to modes shown in the drawings.

As described above, two types of spectrum sensing can be considered: fine sensing and blind sensing, and by combining these, faster sensing is realized. However, in a case of using blind sensing, when wideband detection is performed it is necessary to change a Lo frequency of a mixer, and since this Lo frequency change requires locking a PLL circuit, much time is taken in signal detection. Therefore, by switching a setting of a cutoff frequency of a band limiting filter to perform signal detection, speeding up of signal detection is realized.

Initially, the cutoff frequency of the band limiting filter is set to less than the Nyquist frequency of an A/D (Analog/ Digital) converter, and signal detection is performed. As a result, in a case where it is determined that no signal is present in a band below the first cutoff frequency, the cutoff frequency of the band limiting filter is set to the Nyquist frequency or above, of the A/D converter. In this case, when a signal having a frequency of the Nyquist frequency or above undergoes A/D conversion, this is accompanied by signal folding, but signal detection is possible.

In this way, by switching the cutoff frequency of the band limiting filter, in comparison to a case of changing the Lo frequency of the mixer and performing signal detection, it is possible to detect whether or not a signal is present at high speed.

Figure 2:
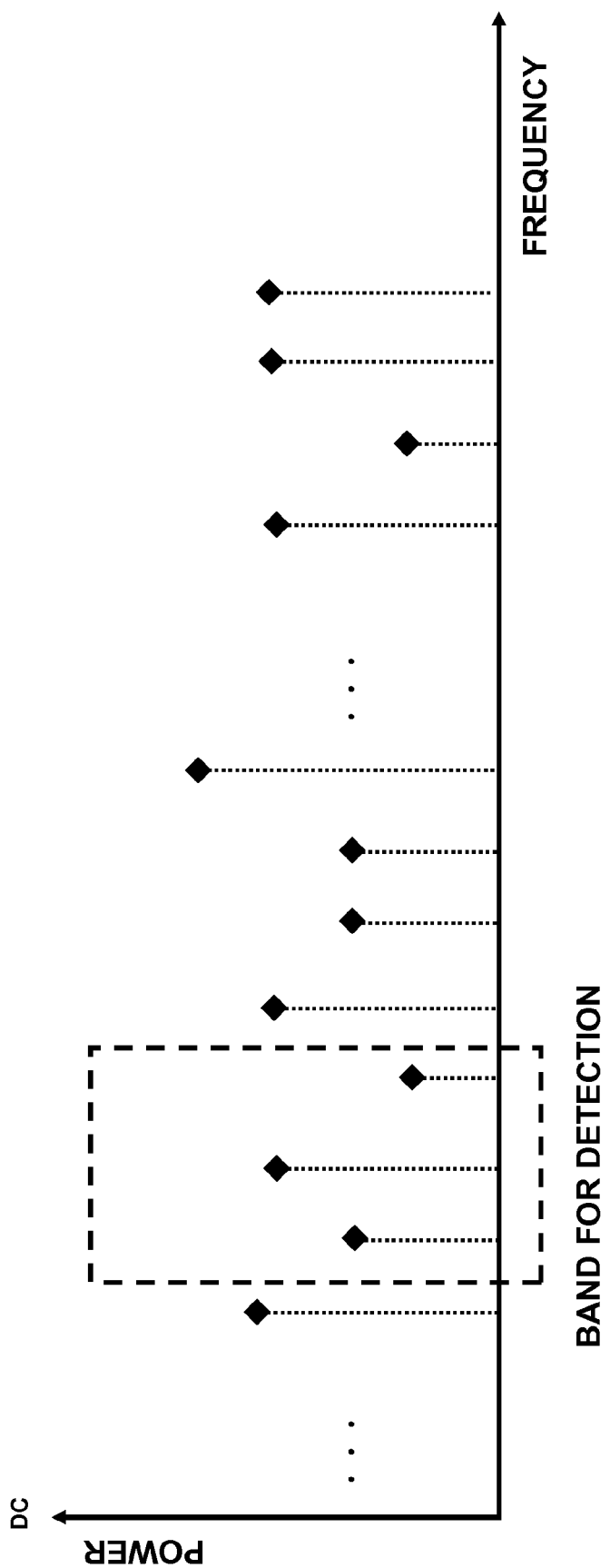
FIG. 2 is a diagram showing power distribution for each frequency in signal detection.

Next, a description is given concerning spectrum sensing and in particular blind sensing. As a method used for blind sensing, use of power detection may be cited. This method is one in which a determination is made as to the presence of a signal by detecting the power of a received signal. For example, if signal distribution as in FIG. 2 is considered as an example, the distribution of power that differs for each frequency is examined in order to determine the presence of the signal. In this regard, since bands in which signal detection can be performed are limited, first the power of a band enclosed by a dotted line is measured, and when detection of an initial detection band is finished, detection of another band is performed.

Figure 3:
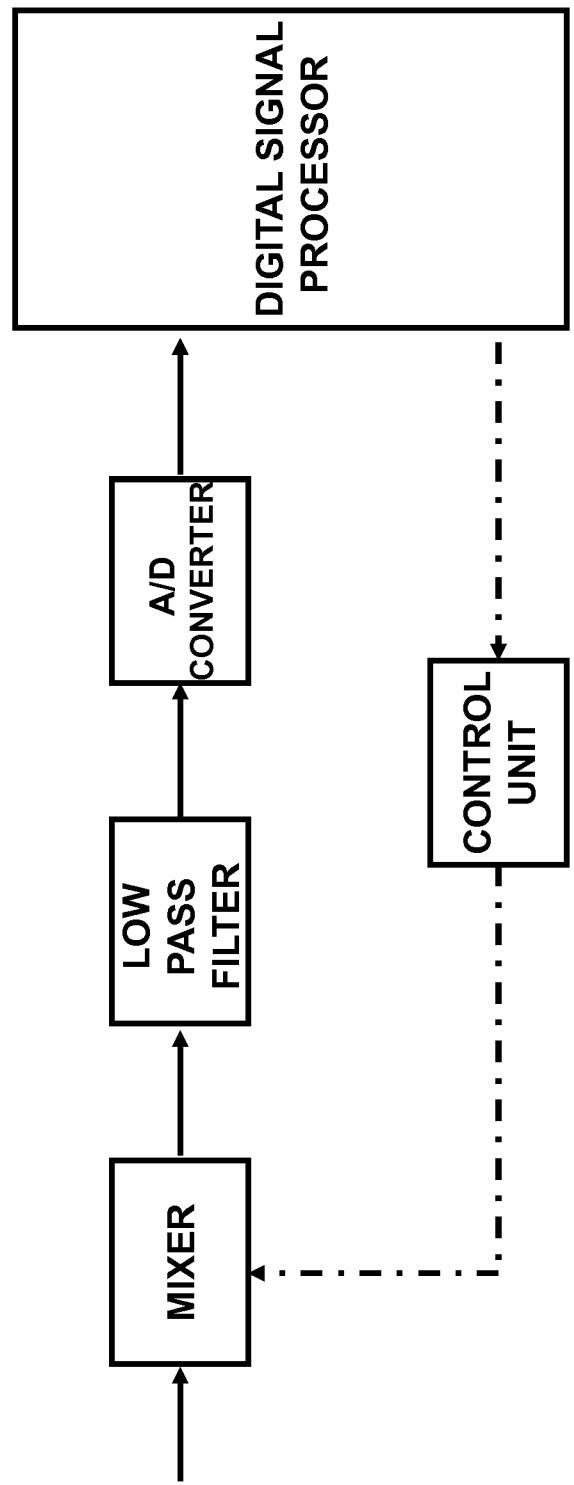
FIG. 3 is a block diagram showing an example of an internal configuration of a signal detection device.

Here, a configuration as in FIG. 3 can be considered as a configuration of a signal detection device when blind sensing (power detection) is performed. The signal detection device shown in FIG. 3 is configured by a mixer that down-converts the frequency of a received signal, a low pass filter for the received signal, an A/D converter that converts a signal outputted from the low pass filter to a digital signal, a digital signal processor, and a control unit.

The abovementioned mixer has a function of down-converting the frequency of the received signal. Thereafter, high frequencies are eliminated by the low pass filter. In this regard, the low pass filter operates as an anti-aliasing filter, and the cutoff frequency thereof is set to half a sampling frequency of the A/D converter, less than or equal to the so-called Nyquist frequency. By setting the cutoff frequency of the low pass filter in this way, signal folding that occurs in sampling is prevented.

Figure 4:
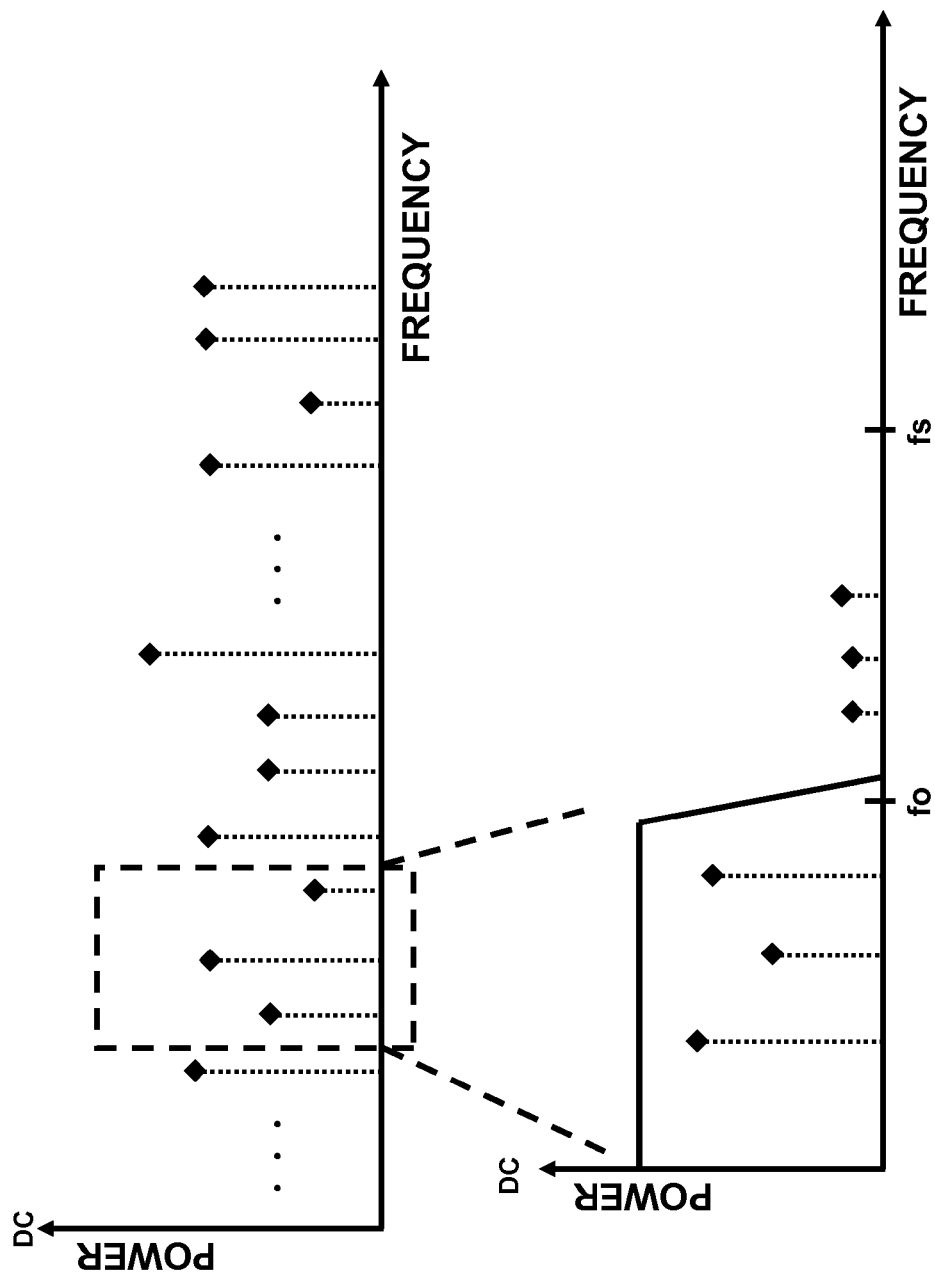
FIG. 4 is a diagram showing an example of a state of signal distribution after passing a low pass filter.

FIG. 4 shows an example of a spectrum of a signal processed by the low pass filter. In FIG. 4, the cutoff frequency of the low pass filter is set to half a sampling frequency (fs) of the A/D converter, that is, to the Nyquist frequency (fo). After filtering by the low pass filter, the received signal is converted to a digital signal by the A/D converter. Thereafter, the power inside the band is detected. There are several methods of obtaining the power inside the band, and a method that uses FFT computation is cited as one of them.

In order to perform spectrum sensing, since a change of the frequency band for detection is necessary, it is possible to change the Lo frequency of the mixer by the control unit. However, switching the Lo frequency requires much time, since lock time is necessary for a PLL circuit generating the Lo signal. Normally, the time for switching the Lo frequency is much longer than the time required for switching bandwidth of the low pass filter 21 or a signal to pass through a circuit. Therefore, when spectrum sensing of a wide band is performed, the greater the number of times the Lo frequency of the mixer is switched, the more the signal detection time increases.

First Exemplary Embodiment

Next, a description is given in more detail concerning a first exemplary embodiment of the present invention, using FIG.

Figure 5:
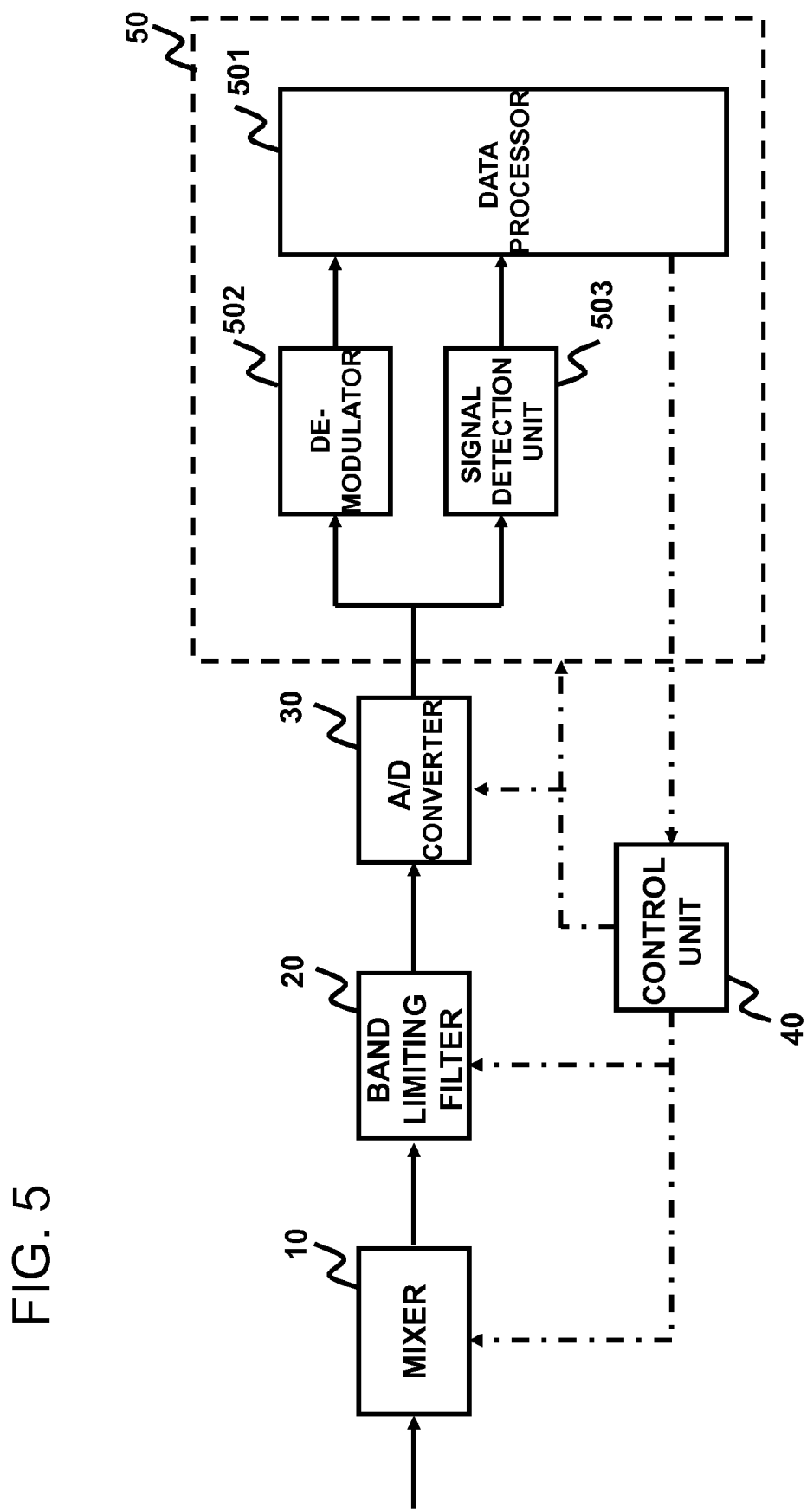
FIG. 5 is a block diagram of an overall signal detection device according to a first exemplary embodiment of the invention.

5. A signal detection device shown in FIG. 5 is configured by a mixer 10, a band limiting filter 20, an A/D converter 30, a control unit 40, and a digital signal processor 50, and the digital signal processor 50 is configured by a data processor 501, a demodulator 502, and a signal detection unit 503.

Similar to the signal detection device shown in FIG. 3, after a received signal is down-converted by the mixer 10, frequencies greater than or equal to the Nyquist frequency are cut by the band limiting filter 20, and conversion to digital signals is performed by the A/D converter 30. A signal on which digital conversion is performed is demodulated by the demodulator 502 of the digital signal processor 50, and data are processed by the data processor 501. Furthermore, a frequency down-converted by the mixer 10 can be changed as necessary by a signal sent from the digital signal processor 50 to the control unit 40.

In addition, the bandwidth of the band limiting filter 20 also can be changed by the control unit 40. This point is different from the signal detection device shown in FIG. 3. That is, for the band limiting filter 20, a filter that can change bandwidth is used, and a variable range of this cutoff frequency includes frequencies greater than or equal to the Nyquist frequency of the A/D converter 30. The band limiting filter 20 operates as an anti-aliasing filter of the A/D converter 30, but it is also possible to use wave shaping of the received signal, or the like. In addition, the signal detection unit 503 can implement either one or both of fine sensing and blind sensing.

Figure 6:
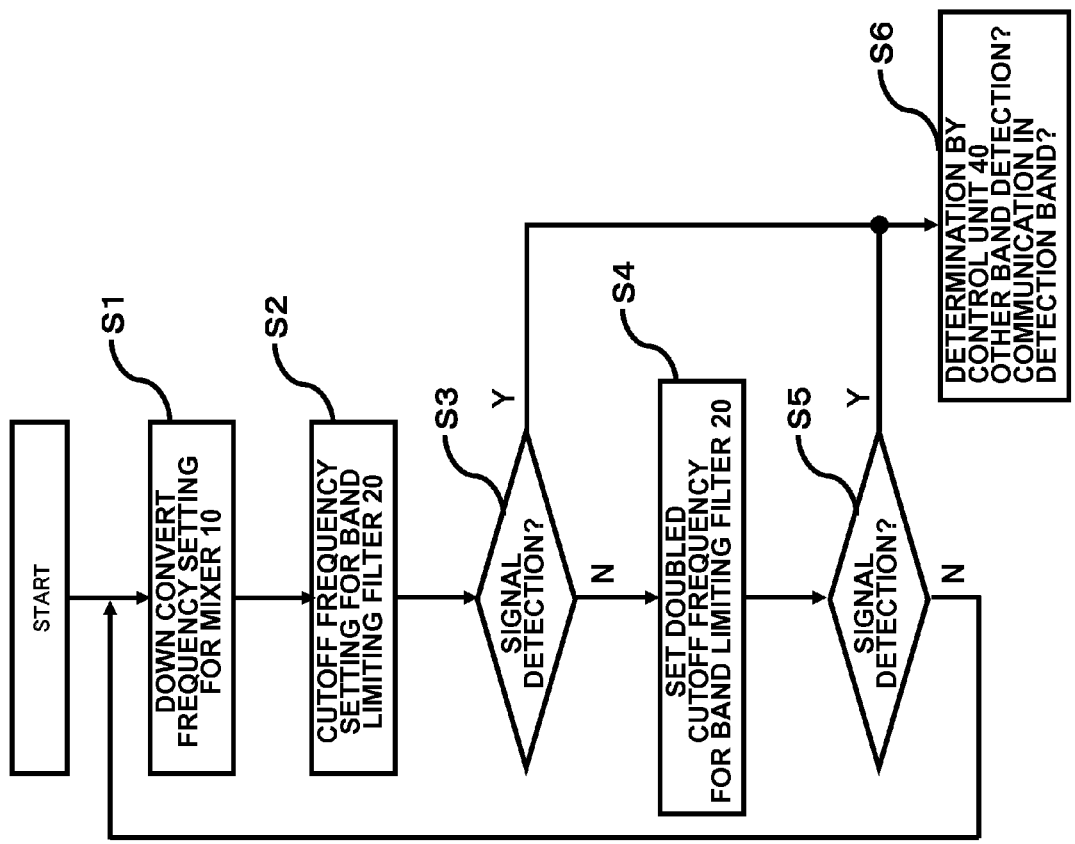
FIG. 6 is a flowchart of signal detection operations in the first exemplary embodiment.

Next, a description is given of operations in the first exemplary embodiment, using FIG. 6.

First, when spectrum sensing is started, a down-converted frequency for the mixer 10 is set, matching a band for which detection is desired (step S1).

Continuing, in step S2 a cutoff frequency of the band limiting filter 20 is decided. In this regard, the cutoff frequency of the band limiting filter 20 is made to match the Nyquist frequency of the A/D converter 30. That is, the sampling frequency of the A/D converter 30 is double the cutoff frequency of the band limiting filter 20. When signal detection is performed in this state, it is possible to obtain a result the same as signal detection by the signal detection device of FIG. 3.

Figure 7:
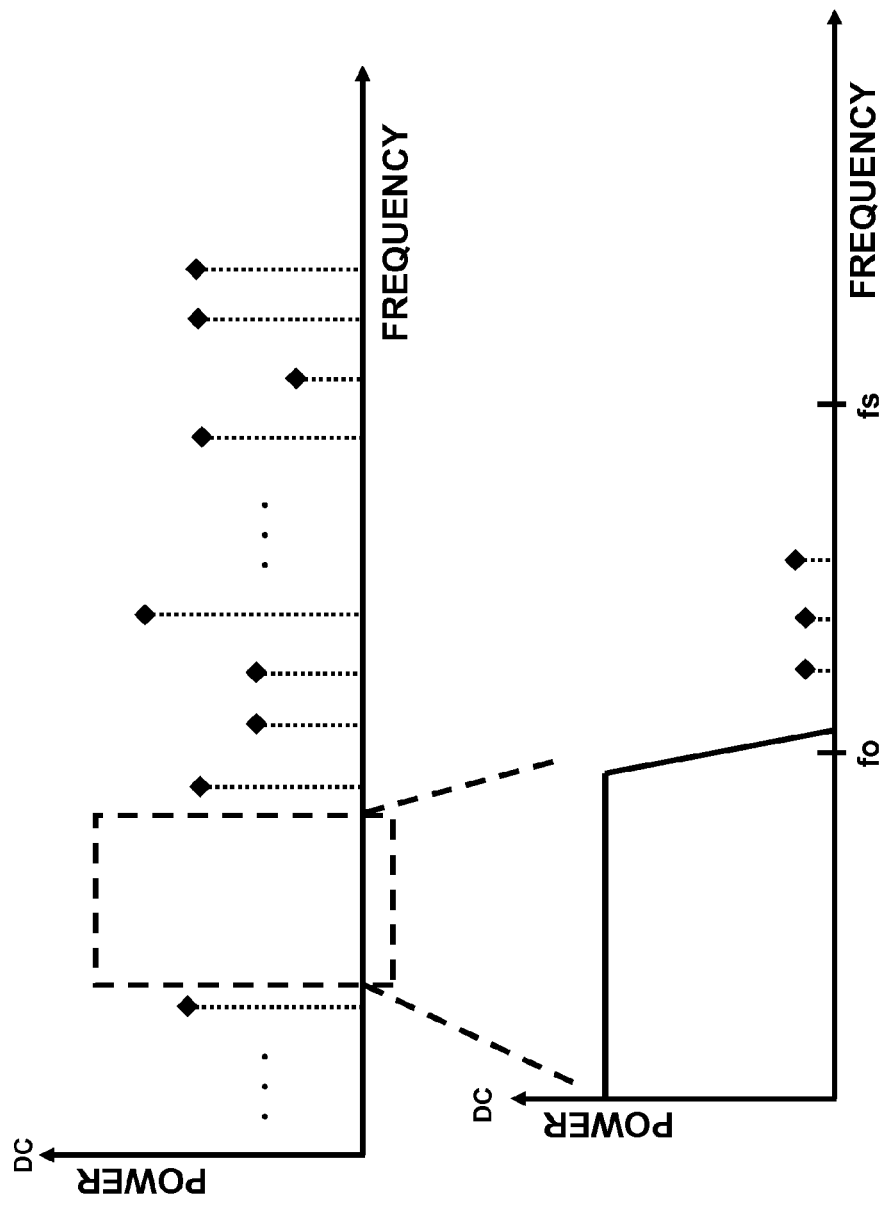
FIG. 7 is a diagram showing an example of signal distribution in the first exemplary embodiment.

A determination is made as to whether or not a signal has been detected inside the band where detection is performed (step S3). If the detection result in this case is that a signal has been detected inside the band as in FIG. 4, control transitions to step S6. However, in a case where a signal cannot be detected, as shown in FIG. 7, control transitions to step S4.

Figure 8:
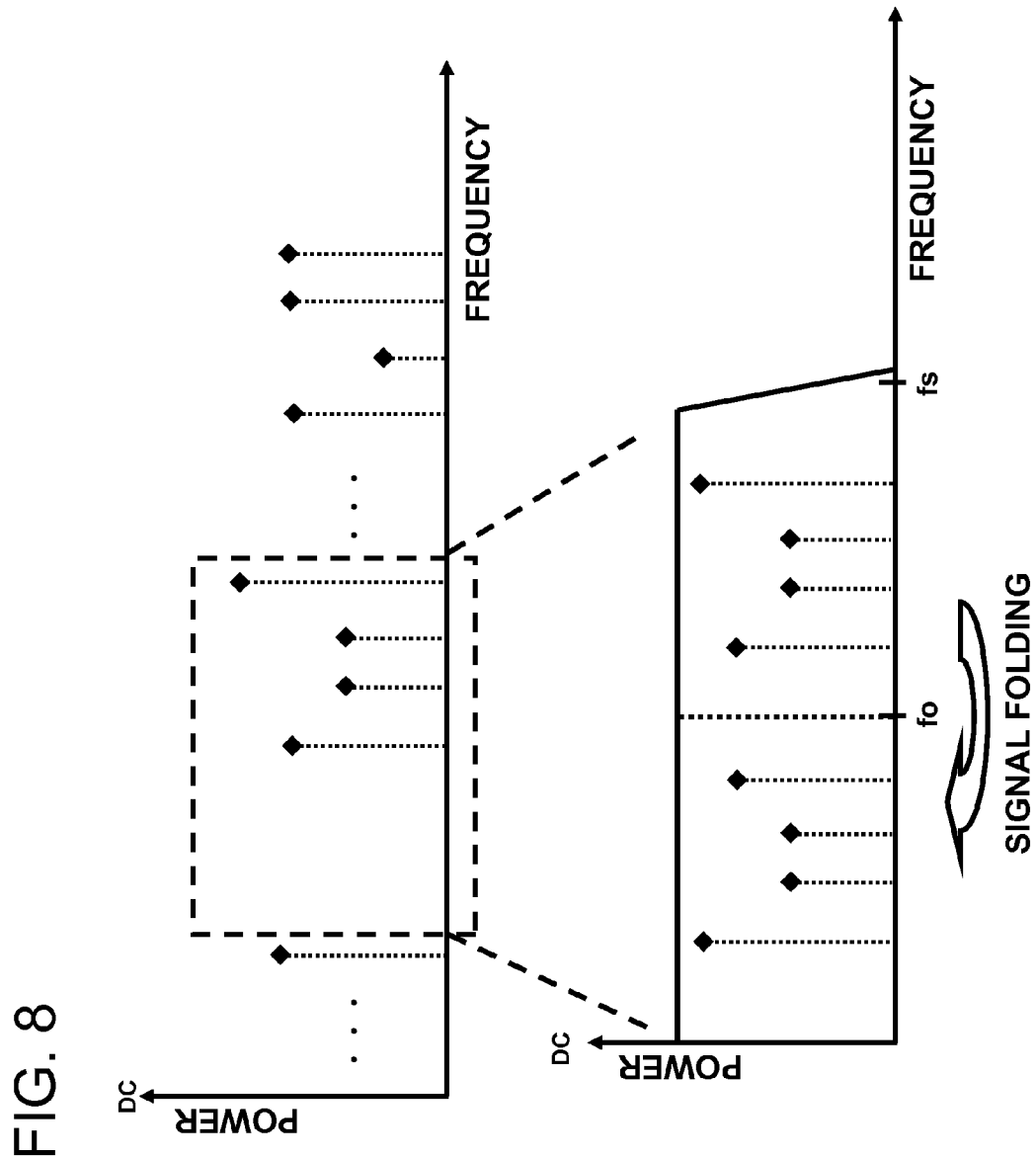
FIG. 8 is a diagram showing an example of signal distribution in the first exemplary embodiment.

In step S4 the cutoff frequency of the band limiting filter 20 is doubled. When signal detection is carried out in this state, it is possible to perform detection by folding of signals from the Nyquist frequency to a sampling frequency (see FIG. 8). As a result, it is possible to perform signal detection of a wide band without changing the Lo frequency of the mixer 10. The detection band in this case is doubled.

In step S5, further detection as to the presence of a signal is performed. Here, if a signal cannot be detected, the Lo frequency of the mixer 10 is changed again by step S1 and signal detection is continued.

In step S6, a selection is made as to whether or not to change the Lo frequency of the mixer 10 and examine another band despite presence of a signal in the band, or to stop operation of the signal detection unit 503, make the demodulator 502 operate, and perform communication using this band. This selection is performed by the control unit 40.

It is to be noted that change of the Lo frequency of the mixer 10 is implemented in a case where it is desired to detect a signal higher than a variable range of the cutoff frequency of the band limiting filter 20, or a case where it is desired to perform signal detection in a state where noise is reduced by lowering the cutoff frequency, and to raise detection sensitivity.

As described above, by switching the cutoff frequency of the band limiting filter in two stages, the number of times of switching of the Lo frequency is decreased, and overall it is possible to shorten the signal detection time.

It is to be noted that in the present exemplary embodiment a description was given of a case where switching of the band limiting filter 20 is performed in two stages, but in a case where a signal has not been detected even by widening the cutoff frequency of the band limiting filter 20 to the sampling frequency of the A/D converter 30, it is possible to further widen the detection band. That is, the cutoff frequency of the band limiting filter 20 is set to be greater than or equal to the sampling frequency. This is because signal folding does not occur only in a band less than or equal to the sampling frequency, but logically occurs as far as an infinite harmonic. Therefore, according to setting the cutoff frequency of the band limiting filter, detection by signal folding is possible without limitation, but in actuality there is a limitation to a certain extent caused by extending the detection band, due to noise increasing.

Figure 9:
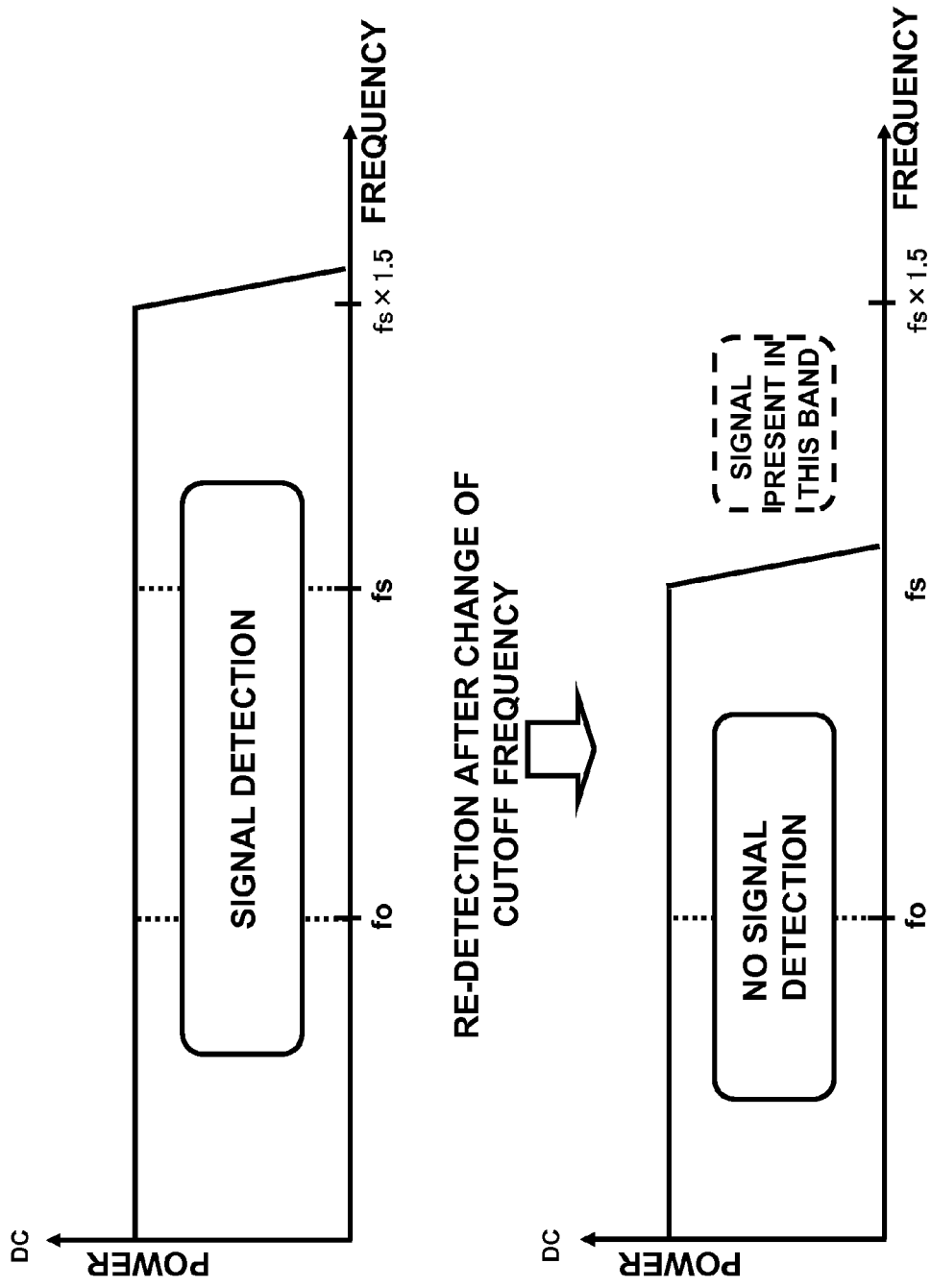
FIG. 9 is a diagram for describing advantages of performing sensing from a high frequency band to a low frequency band.

In the present exemplary embodiment, a description was given concerning a case where the setting of the band limiting filter 20 is changed from a low frequency band to a high frequency band to perform sensing, but conversely it is also possible to perform sensing directed from a high frequency band to a low frequency band. As described above, since it is possible for the cutoff frequency of the band limiting filter 20 to be set to exceed the sampling frequency of the A/D converter 30, the cutoff frequency is set to 1.5 times the sampling frequency to perform signal detection. As a result, in a case where a signal is detected, the signal is present somewhere in a band that is 1.5 times the sampling frequency. Thereafter, the cutoff frequency is set to the sampling frequency and as a result of performing signal detection again, if a signal cannot be detected, it is understood that a signal is present in a band from the sampling frequency to 1.5 times the sampling frequency (refer to FIG. 9). In this way, detection is started preliminarily in a wide band and if there is no signal in this band, detection has been performed for the wide band with one detection. Furthermore, in a case where a signal could be detected, if signal detection is performed being directed from a high frequency band to a low frequency band, it is possible to quickly identify a band where the signal is present. This is common to all the following exemplary embodiments.

It is to be noted that the band limiting filter 20 used in the present exemplary embodiment preferably gives consideration to a case of performing detection of a band that is distant from the Lo frequency of the mixer 10, to have a complex band limiting filter in which complex component elimination is possible. However, there is no limitation to this in the present invention, and due to not being principal content of the invention, details are omitted.

Second Exemplary Embodiment

Figure 10:
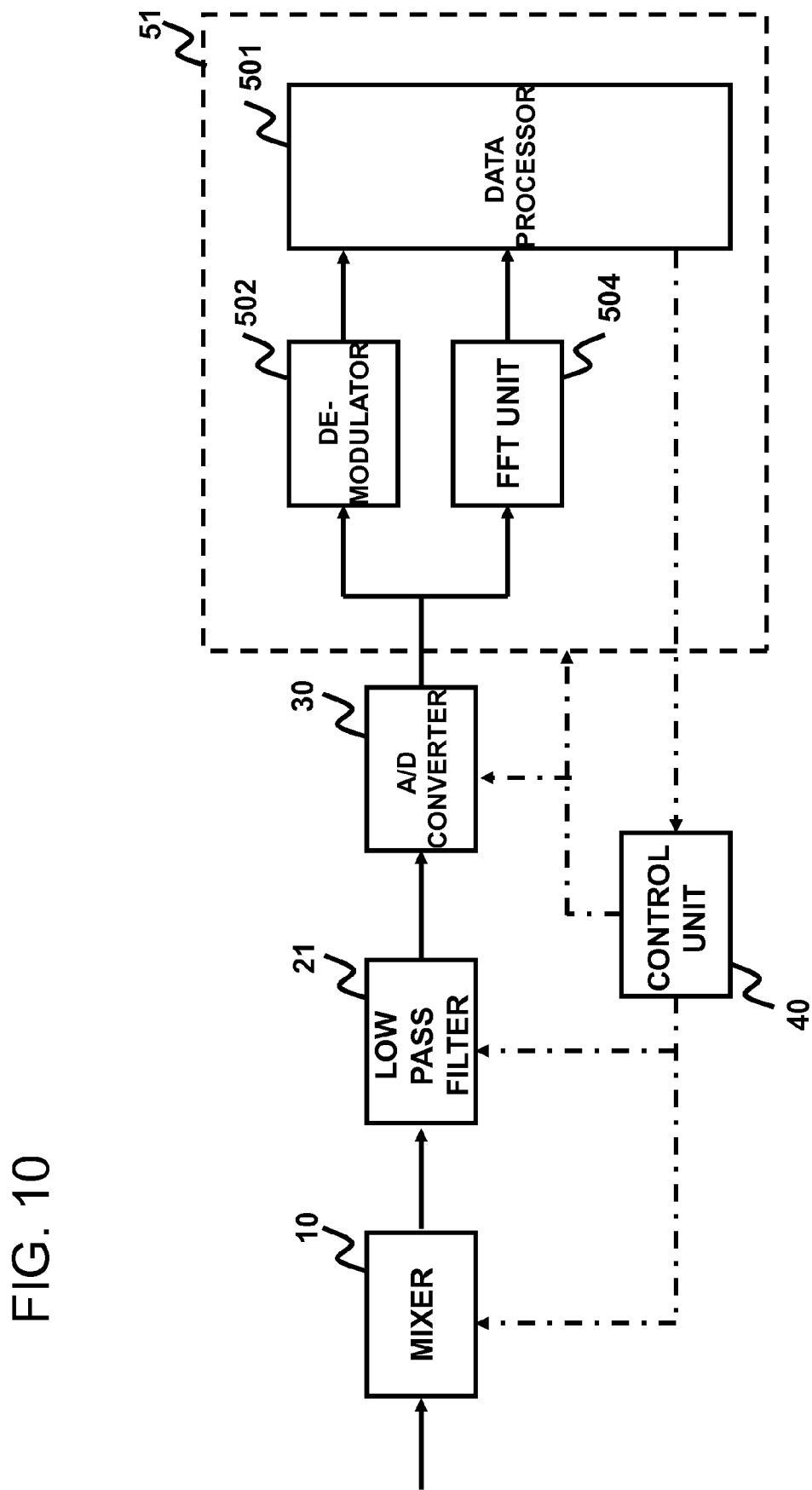
FIG. 10 is a block diagram of an overall signal detection device according to a second exemplary embodiment.

Next, a detailed description is given concerning a second exemplary embodiment, making reference to the drawings. FIG. 10 shows the second exemplary embodiment of the present invention. In FIG. 10, component elements that are identical to FIG. 5 are represented by the same symbols and descriptions thereof are omitted.

Points of difference from the first exemplary embodiment are that a low pass filter 21 is used for the band limiting filter 20, and the signal detection unit 503 is an FFT unit 504. A digital signal processor 51 in the present exemplary embodiment is provided with a demodulator 502 that performs demodulation of a digital signal outputted by an A/D converter 30, and the FFT unit 504 that performs detection of a signal by FFT, and the digital signal processor 51 switches operation in accordance with state.

Here, if it is assumed that sensing appropriate to IEEE 802.22 is performed, since frequencies are allocated at intervals of 6 to 8 MHz with respect to channels in digital television, with the low pass filter 21 the cutoff frequency can be switched at these intervals of 6 to 8 MHz.

Next, a description is given concerning a method of detecting a signal in the FFT unit 504. In the FFT unit 504 used in FIG. 10, the power is obtained for a signal where time-frequency conversion has been performed, and the presence of a signal is determined according to whether the power exceeds a certain value. This is the same as a case where the cutoff frequency of the low pass filter 21 is doubled, and signal folding occurs.

Here, a situation may be considered where noise increases due to the doubling of the band, and detection sensitivity for detecting the presence of a signal according to signal power, decreases. However, with regard to this point, by continuously performing detection in the same band and computing an average thereof, it is possible to improve signal-to-noise ratio (SN ratio).

Sampling frequency of the A/D converter 30 is changed as necessary. That is, when a signal is detected by FFT computation, since frequency resolution and sampling frequency are in a proportional relationship, in a case of performing signal detection by increasing the frequency resolution it is necessary to increase the sampling frequency. However, since in this case the band in which detection is possible becomes narrow (since time domain resolution decreases), the band in which detection by one FFT computation is possible becomes narrow. Therefore, if the sampling frequency is changed in accordance with the frequency resolution of a signal that is a target for signal detection, the number of times the FFT computation is performed can be reduced.

Third Exemplary Embodiment

Figure 11:
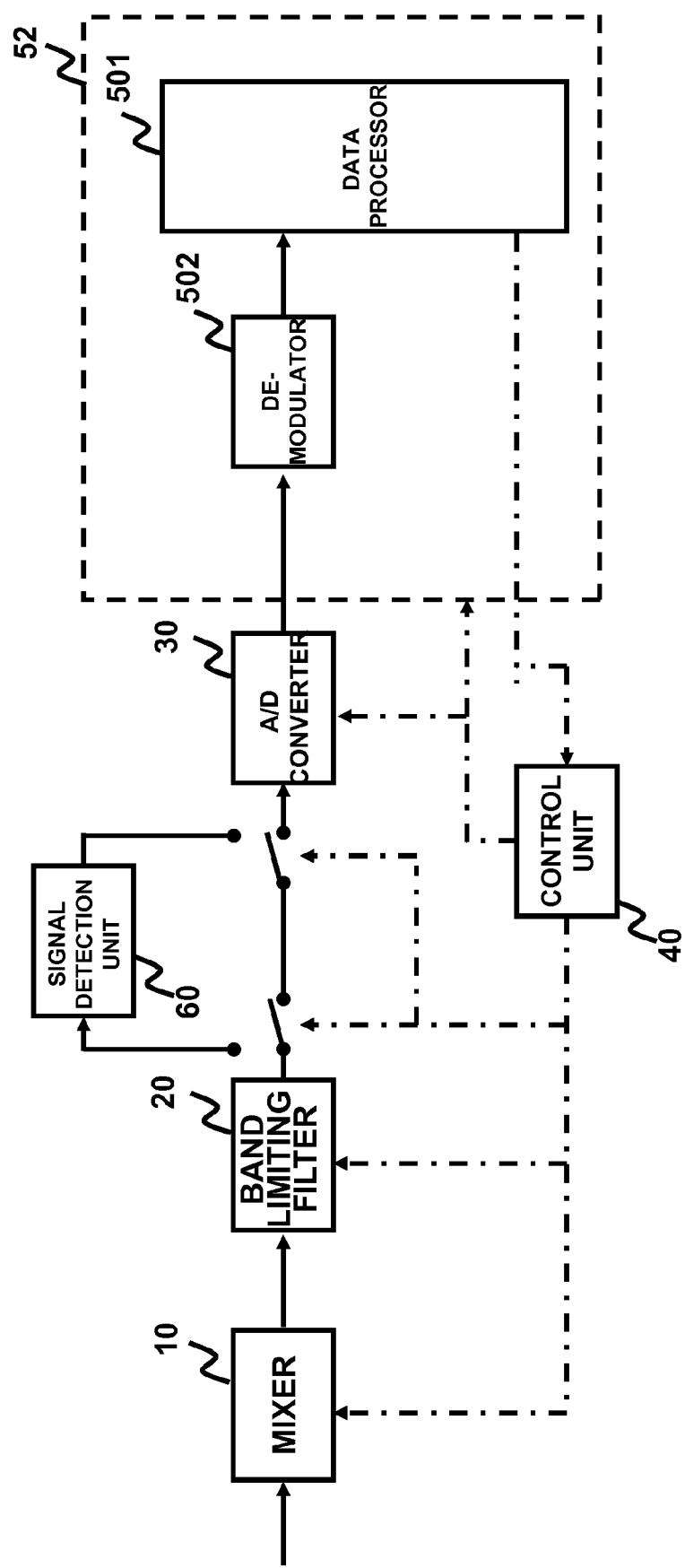
FIG. 11 is a block diagram of an overall signal detection device according to a third exemplary embodiment.

Next, a detailed description is given concerning a third exemplary embodiment, making reference to the drawings. FIG. 11 shows the third exemplary embodiment of the present invention. In FIG. 11, component elements that are identical to FIG. 5 are represented by the same symbols and descriptions thereof are omitted.

Signal detection need not necessarily be performed in a digital domain, and may be performed between a band limiting filter 20 and an A/D converter 30. At this time, switching is performed to a path from the band limiting filter 20 to the A/D converter 30 when normal reception operation is performed, and to a path from the band limiting filter 20 to a signal detection unit 60 when signal detection is performed.

In order to perform signal detection in a preliminary stage of the A/D converter 30, signal detection by a discrete signal processing system in the signal detection unit 60 is necessary. As an example of the signal detection unit 60, usage of an analog FFT circuit as shown in Patent Literature 1 may be cited. In the analog FFT circuit, an analog discrete Fourier transform is performed. Since sampling and holding, which is discrete signal processing, is included in this analog FFT, signal folding occurs.

It is to be noted that since, in analog FFT circuit output and normal reception, signals received by the A/D converter 30 differ, the A/D converter 30 can change the sampling frequency as necessary, and this control is performed by a control unit 40.

Fourth Exemplary Embodiment

Figure 12:
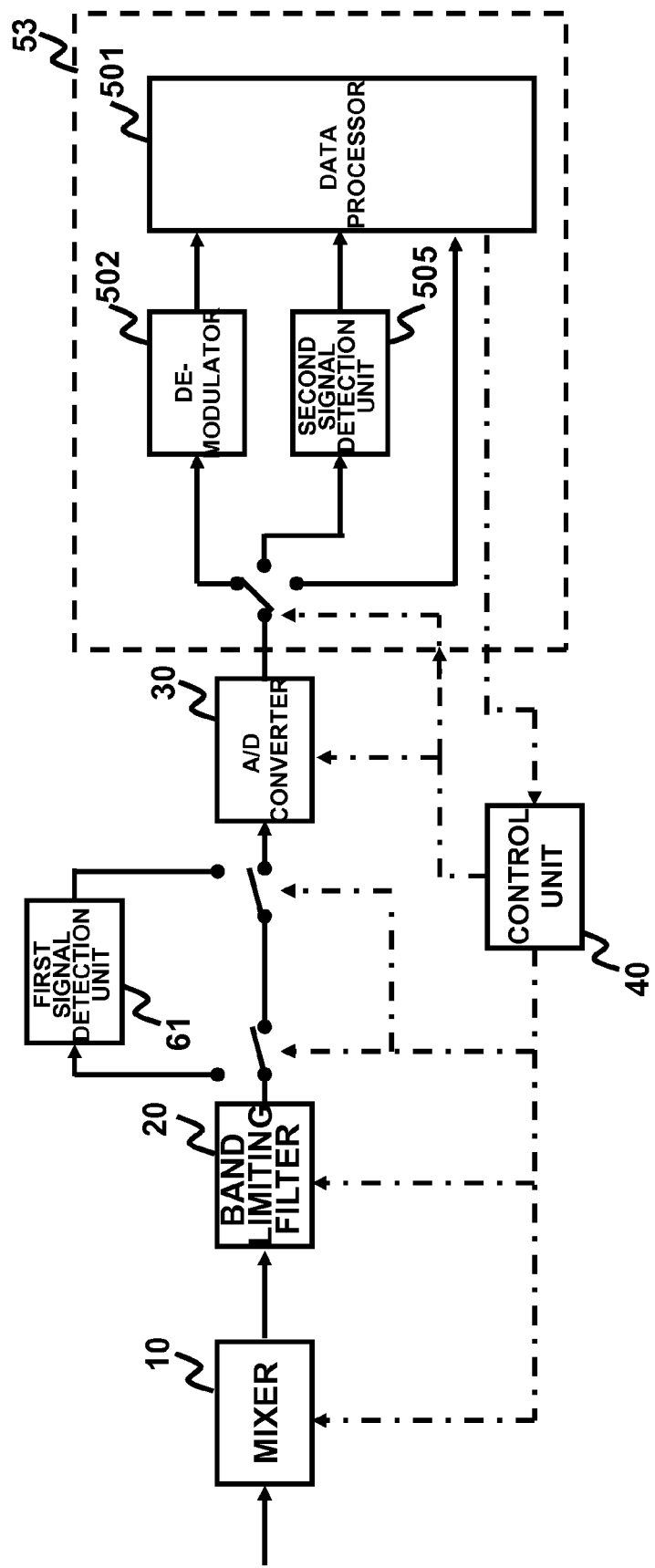
FIG. 12 is a block diagram of an overall signal detection device according to a fourth exemplary embodiment.

Next, a detailed description is given concerning a fourth exemplary embodiment, making reference to the drawings. FIG. 12 shows the fourth exemplary embodiment of the present invention. In FIG. 12, component elements that are identical to FIG. 5 are represented by the same symbols and descriptions thereof are omitted.

In the present exemplary embodiment, signal detection is performed in both an analog domain and a digital domain. As a signal detection circuit for this, a first signal detection unit 61 and a second signal detection unit 505 are provided. In this case it is desirable that blind sensing is performed in an analog domain which excels in having high speed, and that highly sensitive fine sensing be performed in a digital domain. It is to be noted that since the first signal detection unit 61, the second signal detection unit 505, and a demodulator 502 do not each operate at the same time, an addition is made of a path that does not go through the demodulator 502 and the second signal detection unit 505 when the first signal detection unit 61 operates, and switching thereof is controlled by the control unit 40.

Fifth Exemplary Embodiment

Figure 13:
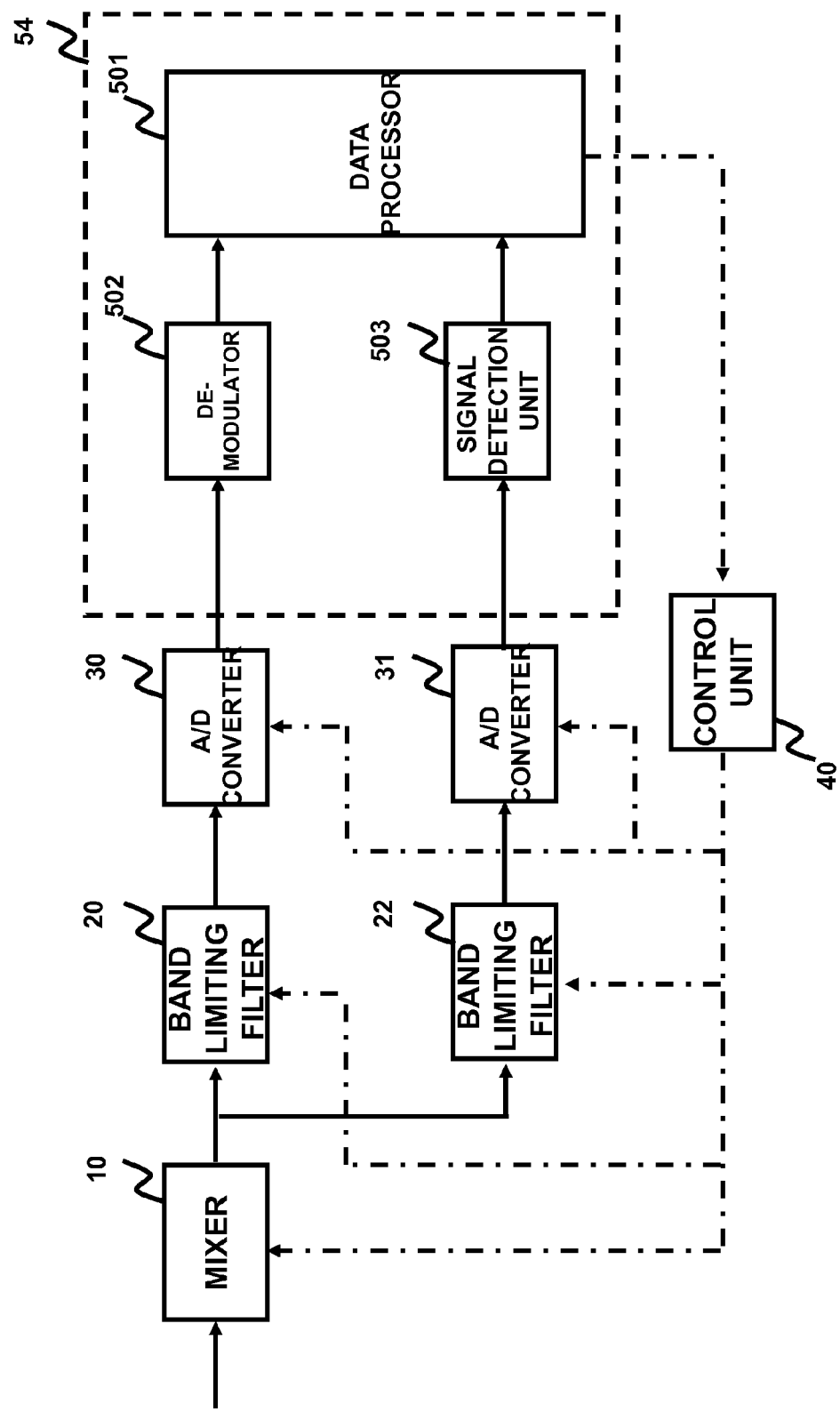
FIG. 13 is a block diagram of an overall signal detection device according to a fifth exemplary embodiment.

Next, a detailed description is given concerning a fifth exemplary embodiment, making reference to the drawings. FIG. 13 shows the fifth exemplary embodiment of the present invention. In FIG. 13, component elements that are identical to FIG. 5 are represented by the same symbols and descriptions thereof are omitted.

The present exemplary embodiment differs from other exemplary embodiments in using two band limiting filters 20 and 22. Passbands of the band limiting filters 20 and 22 are different and do not affect each other. A signal that passes the band limiting filter 20 is demodulated by a demodulator 502. A signal that passes the band limiting filter 22 is used to detect the presence of a signal by a signal detection unit 503.

In this way, if two band limiting filters are used, it is possible to perform signal demodulation and signal detection at the same time. That is, within a variable band of the band limiting filter 22, it is possible to perform communication and sensing at the same time without changing a Lo frequency of a mixer 10. Furthermore, since an A/D converter 31 is only used in signal detection, it is not necessary to consider signal folding generated when sampling is done when communication is carried out, and since a cutoff frequency of the band limiting filter 22 can be set to exceed a sampling frequency of the A/D converter 31, the sampling frequency of the A/D converter 30 can be set to be low. It is to be noted that setting of the band limiting filters 20 and 22, executing and stopping signal detection operation, and changing signal detection band are performed by the control unit 40.

Finally, preferable modes of the present invention are summarized.

[First Mode]
(See the signal detection device according to the first aspect.)

[Second Mode]
The signal detection device according to the first mode, further including: a mixer that can down-convert the frequency of a received signal, wherein, in a case where a signal cannot be detected in the first signal detection and the second signal detection, the control unit changes a local frequency of the mixer, and performs the first signal detection and the second signal detection.

[Third Mode]

The signal detection device according to the first or second mode, wherein: sampling frequency can be changed for the A/D converter, and the control unit causes a change to a sampling frequency corresponding to frequency resolution of a signal detection band, and performs the first signal detection and the second signal detection.

[Fourth Mode]

The signal detection device according to any one of the first to third modes, wherein: the signal detection unit performs the first signal detection and the second signal detection by a digital signal outputted by the A/D converter.

[Fifth Mode]

The signal detection device according to the fourth mode, including: an analog domain signal detection unit instead of the signal detection unit, the analog domain signal detection unit performing discrete signal processing on output of the band limiting filter, and performing the first signal detection and the second signal detection.

[Sixth Mode]

The signal detection device according to the fifth mode, further including: a digital domain signal detection unit that performs the first signal detection and the second signal detection by a digital signal outputted by the A/D converter, wherein the analog domain signal detection unit performs the first signal detection and the second signal detection without using a characteristic of a received signal, and the digital domain signal detection unit performs the first signal detection using a characteristic of a received signal.

[Seventh Mode]

The signal detection device according to any one of the first to sixth modes, further including: a reception band limiting filter that limits a received signal band, a reception A/D converter that performs A/D conversion of a signal outputted by the reception band limiting filter, and a demodulator that performs demodulation of received data, from a signal outputted by the reception A/D converter, wherein the control unit simultaneously executes demodulation of the received data by the demodulator, and detection of whether or not a signal of a specific frequency is present by the signal detection unit.

[Eighth Mode]

The signal detection device according to any one of the first to seventh modes, wherein, the control unit that, with a cutoff frequency of the band limiting filter greater than or equal to a sampling frequency of an A/D converter, performs third signal detection to cause the signal detection unit to detect a signal, and in a case where a signal is detected by the third signal detection, lowers the cutoff frequency of the band limiting filter and repeats signal detection by the signal detection unit to as far as where a signal cannot be detected.

[Ninth Mode]

The signal detection device according to any one of the first to eighth modes, wherein, the first signal detection and the second signal detection use received signal power.

[Tenth Mode]

The signal detection device according to the ninth mode, wherein the power of the received signal is measured by a FFT (Fast Fourier Transform) computation process.

[Eleventh Mode]

(See the method of controlling a signal detection device according to the second aspect).

[Twelfth Mode]

The method of controlling a signal detection device according to the eleventh mode, wherein the signal detection device is provided with a mixer that can down-convert the frequency of a received signal, the method including a step, in a case where a signal cannot be detected in the first signal detection step and the second signal detection step, of changing a local frequency of the mixer, and a step of again performing the first signal detection step and the second signal detection step.

[Thirteenth Mode]

The method of controlling a signal detection device according to the eleventh or twelfth mode, wherein sampling frequency can be changed for the A/D converter, the method including a step of changing the sampling frequency of the A/D converter to a sampling frequency corresponding to a frequency resolution of a signal detection band, and a step of again performing the first signal detection step and the second signal detection step.

[Fourteenth Mode]

The method of controlling a signal detection device according to the thirteenth mode, wherein the signal detection device is provided with an analog domain signal detection unit instead of the signal detection unit, the analog domain signal detection unit performing discrete signal processing on output of the band limiting filter and detecting whether or not a signal of a specific frequency is present, and furthermore a digital domain signal detection unit that detects whether or not a signal of a specific frequency is present by a digital signal outputted by the A/D converter, the method including: a step of performing the first signal detection step and the second signal detection step without using a characteristic of a received signal by the analog domain signal detection unit, and a step of performing the first signal detection step using a characteristic of a received signal by the digital domain signal detection unit.

[Fifteenth Mode]

The method of controlling a signal detection device according to any one of the eleventh to fourteenth modes, wherein the signal detection device is further provided with: a reception band limiting filter that limits a received signal band, a reception A/D converter that performs A/D conversion of a signal outputted by the reception band limiting filter, and a demodulator that performs demodulation of received data, from a signal outputted by the reception A/D converter, wherein the method includes: a step of simultaneously executing demodulation of the received data by the demodulator, and detection of whether or not a signal of a specific frequency is present by the signal detection unit.

[Sixteenth Mode]

The method of controlling a signal detection device according to any one of the eleventh to fifteenth modes, including a third signal detection step of causing the signal detection unit, with a cutoff frequency of the band limiting filter greater than or equal to a sampling frequency of an A/D converter, to detect a signal, and a step, in a case where a signal is detected by the third signal detection step, of lowering the cutoff frequency of the band limiting filter and repeating signal detection by the signal detection unit as far as where a signal cannot be detected.

[Seventeenth Mode]

(See the program according the third aspect.)

[Eighteenth Mode]

The program according to the seventeenth mode, wherein the signal detection device is provided with a mixer that can down-convert the frequency of a received signal, the program executing a process, in a case where a signal cannot be detected in the first signal detection process and the second signal detection process, of changing a local frequency of the mixer, and a process of again performing the first signal detection process and the second signal detection process.
[Nineteenth Mode]
The program according to the seventeenth or eighteenth mode, wherein a sampling frequency can be changed for the A/D converter, the program including a process of changing the sampling frequency of the A/D converter to a sampling frequency corresponding to a frequency resolution of a signal detection band, and a process of again performing the first signal detection process and the second signal detection process.
[Twentieth Mode]
The program according to any one of the seventeenth to nineteenth modes, wherein the signal detection device is provided with an analog domain signal detection unit instead of the signal detection unit, the analog domain signal detection unit performing discrete signal processing on output of the band limiting filter and detecting whether or not a signal of a specific frequency is present, and furthermore a digital domain signal detection unit that detects whether or not a signal of a specific frequency is present by a digital signal outputted by the A/D converter, and wherein the program executes: a process of performing the first signal detection process and the second signal detection process without using a characteristic of a received signal by the analog domain signal detection unit, and a process of performing the first signal detection process using a characteristic of a received signal by the digital domain signal detection unit.
[Twenty-First Mode]
The program according to any one of the seventeenth to twentieth mode, wherein the signal detection device is further provided with: a reception band limiting filter that limits a received signal band, a reception A/D converter that performs A/D conversion of a signal outputted by the reception band limiting filter, and a demodulator that performs demodulation of received data, from a signal outputted by the reception A/D converter, wherein the program simultaneously executes demodulation of the received data by the demodulator, and detection of whether or not a signal of a specific frequency is present by the signal detection unit.
[Twenty-Second Mode]
The program according to the seventeenth to twenty-first mode, wherein the program executes a third signal detection process of causing the signal detection unit to detect a signal, with a cutoff frequency of the band limiting filter greater than or equal to a sampling frequency of the A/D converter, and a process, in a case where a signal is detected by the third signal detection process, of lowering the cutoff frequency of the band limiting filter and repeating signal detection by the signal detection unit as far as where a signal cannot be detected.
[Twenty-Second Mode]
(See the wireless communication device according to the fourth aspect).

The respective disclosures of the abovementioned Patent Literature are incorporated herein by reference thereto. Modifications and adjustments of exemplary embodiments are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof. For example, the method of signal detection is not limited to power detection by FFT. Also with regard to a band limiting filter there is no limitation to a low pass filter, and in a case of performing sensing from low pass to high pass, it is possible to eliminate low frequency signals and to improve detection sensitivity by using a bandpass filter.

REFERENCE SIGNS LIST 10 mixer
20, 22 band limiting filter
21 low pass filter
30, 31 A/D converter
40 control unit
50 to 54 digital signal processor
60, 503 signal detection unit
61 first signal detection unit
501 data processor
502 demodulator
504 FFT unit
505 second signal detection unit

The invention claimed is:

1. A signal detection device, comprising:
a band limiting filter with a cutoff frequency which is changeable;
a signal detection unit that detects whether or not a signal of a specific frequency is present, from a received signal; and
a control unit that executes a first signal detection that causes said signal detection unit to detect the signal, when a first cutoff frequency of said band limiting filter is less than a Nyquist frequency of an A/D (Analog/Digital) converter, and a second signal detection that causes said signal detection unit to detect the signal, when a second cutoff frequency of said band limiting filter is greater than or equal to the Nyquist frequency of said A/D converter; wherein, initially, the cutoff frequency of said band limiting filter is set to first cutoff frequency of less than the Nyquist frequency of said A/D converter to perform signal detection and in a case where it is determined that no signal is present in a band below the first cutoff frequency, the cutoff frequency of said band limiting filter is set to the second cutoff frequency of greater than or equal to the Nyquist frequency of said A/D converter.

2. The signal detection device according to claim 1, further comprising a mixer that down-converts the frequency of a received signal, wherein,
in a case where a signal is not detected in said first signal detection and said second signal detection, said control unit changes a local frequency of said mixer, and performs said first signal detection and said second signal detection.

3. The signal detection device according to claim 1, wherein
a sampling frequency is changeable for said A/D converter, and
said control unit causes a change to a sampling frequency corresponding to a frequency resolution of a signal detection band, and performs said first signal detection and said second signal detection.

4. The signal detection device according to claim 1, wherein said signal detection unit performs said first signal detection and said second signal detection by a digital signal outputted by said A/D converter.

5. The signal detection device according to claim 4, comprising an analog domain signal detection unit instead of said signal detection unit, said analog domain signal detection unit performing discrete signal processing on output of said band limiting filter, and performing said first signal detection and said second signal detection.

6. The signal detection device according to claim 5, further comprising:
a digital domain signal detection unit that performs said first signal detection and said second signal detection by a digital signal outputted by said A/D converter, wherein said analog domain signal detection unit performs said first signal detection and said second signal detection without using a characteristic of a received signal, and
said digital domain signal detection unit performs said first signal detection using a characteristic of a received signal.

7. The signal detection device according to claim 1, further comprising:
a reception band limiting filter that limits a received signal band;
a reception A/D converter that performs A/D conversion of a signal outputted by said reception band limiting filter; and
a demodulator that performs demodulation of received data, from a signal outputted by said reception A/D converter; wherein
said control unit simultaneously executes demodulation of the received data by said demodulator, and detection of whether or not a signal of a specific frequency is present by said signal detection unit.

8. A method of controlling a signal detection device comprising:
a band limiting filter with a cutoff frequency which is changeable; and
a signal detection unit that detects whether or not a signal of a specific frequency is present, from a received signal; wherein said method, comprising:
executing a first signal detection that causes said signal detection unit to detect the signal, when a first cutoff frequency of said band limiting filter is less than a Nyquist frequency of an A/D (Analog/Digital) converter; and
executing a second signal detection that causes said signal detection unit to detect the signal, when a second cutoff frequency of said band limiting filter is greater than or equal to the Nyquist frequency of said A/D (Analog/Digital) converter;
wherein, initially, the cutoff frequency of said band limiting filter is set to first cutoff frequency of less than the Nyquist frequency of said A/D converter to perform signal detection and in a case where it is determined that no signal is present in a band below the first cutoff frequency, the cutoff frequency of said band limiting filter is set to the second cutoff frequency of greater than or equal to the Nyquist frequency of said A/D converter.

9. A computer readable non-transitory medium storing a program to be executed on a computer configuring a signal detection device comprising:
a band limiting filter with a cutoff frequency which is changeable; and
a signal detection unit that detects whether or not a signal of a specific frequency is present, from a received signal; wherein said program executes:
a first signal detection process of causing said signal detection unit to detect a signal, with
a first cutoff frequency of said band limiting filter less than a Nyquist frequency of an A/D (Analog/Digital) converter; and a second signal detection process of causing said signal detection unit to detect the signal, when a second cutoff frequency of said band limiting filter is greater than or equal to the Nyquist frequency of said A/D converter;
wherein, initially, the cutoff frequency of said band limiting filter is set to first cutoff frequency of less than the Nyquist frequency of said A/D converter to perform signal detection and in a case where it is determined that no signal is present in a band below the first cutoff frequency, the cutoff frequency of said band limiting filter is set to the second cutoff frequency of greater than or equal to the Nyquist frequency of said A/D converter.

10. A wireless communication device comprising said signal detection device according to claim 1.

11. The signal detection device according to claim 1, wherein,
the control unit that, with a cutoff frequency of the band limiting filter greater than or equal to a sampling frequency of an A/D converter, performs third signal detection to cause the signal detection unit to detect a signal, and in a case where a signal is detected by the third signal detection, lowers the cutoff frequency of the band limiting filter and repeats signal detection by the signal detection unit to as far as where a signal is not detected.

12. The signal detection device according to claim 1, wherein, the first signal detection and the second signal detection use received signal power.

13. The signal detection device according to claim 12, wherein, the power of the received signal is measured by a FFT (Fast Fourier Transform) computation process.

14. The method of controlling a signal detection device according to claim 8, wherein the signal detection device is provided with a mixer that down-converts the frequency of a received signal,
the method including, in a case where a signal is not detected in the first signal detection and the second signal detection,
changing a local frequency of the mixer; and
executing the first signal detection and the second signal detection, again.

15. The method of controlling a signal detection device according to claim 8, wherein sampling frequency is changeable for the A/D converter,
the method including
changing the sampling frequency of the A/D converter to a sampling frequency corresponding to a frequency resolution of a signal detection band; and
executing the first signal detection and the second signal detection, again.

16. The method of controlling a signal detection device according to claim 15, wherein the signal detection device is provided with an analog domain signal detection unit instead of the signal detection unit, the analog domain signal detection unit performing discrete signal processing on output of the band limiting filter and detecting whether or not a signal of a specific frequency is present, and furthermore a digital domain signal detection unit that detects whether or not a signal of a specific frequency is present by a digital signal outputted by the A/D converter,
the method including:
executing the first signal detection and the second signal detection without using a characteristic of a received signal by the analog domain signal detection unit; and
executing the first signal detection using a characteristic of a received signal by the digital domain signal detection unit.

17. The method of controlling a signal detection device according to claim 8, wherein the signal detection device is further provided with:
- a reception band limiting filter that limits a received signal band,
- a reception A/D converter that performs A/D conversion of a signal outputted by the reception band limiting filter; and
- a demodulator that performs demodulation of received data, from a signal outputted by the reception A/D converter, wherein the method includes:
executing demodulation of the received data by the demodulator, and detection of whether or not a signal of a specific frequency is present by the signal detection unit, simultaneously.

18. The method of controlling a signal detection device according to claim 8, including:
executing a third signal detection that causes the signal detection unit, with a cutoff frequency of the band limiting filter greater than or equal to a sampling frequency of an A/D converter, to detect a signal; lowering the cutoff frequency of the band limiting filter, in a case where a signal is detected by the third signal detection; and repeating signal detection by the signal detection unit as far as where a signal is not detected.

19. The medium according to claim 9, wherein the signal detection device is provided with a mixer that down-converts the frequency of a received signal,
the program executing a process, in a case where a signal is not detected in the first signal detection process and the second signal detection process, of changing a local frequency of the mixer, and a process of again performing the first signal detection process and the second signal detection process.

20. The medium according to claim 9, wherein a sampling frequency is changeable for the A/D converter,
the program including a process of changing the sampling frequency of the A/D converter to a sampling frequency corresponding to a frequency resolution of a signal detection band, and a process of again performing the first signal detection process and the second signal detection process.

\* \* \* \* \*